United States Patent
Rothschiller et al.

(10) Patent No.: US 7,337,182 B2
(45) Date of Patent: *Feb. 26, 2008

(54) MANAGEMENT OF MARKUP LANGUAGE DATA MAPPINGS AVAILABLE TO A SPREADSHEET APPLICATION WORKBOOK

(75) Inventors: Chad Rothschiller, Edmonds, WA (US); Kelly J. Lynch, Redmond, WA (US); Ramakrishnan Natarajan, Redmond, WA (US); Juha Niemisto, Mercer Island, WA (US); Marise Chan, Redmond, WA (US); Thibaut Vial, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 128 days.

This patent is subject to a terminal disclaimer.

(21) Appl. No.: 11/214,222

(22) Filed: Aug. 29, 2005

(65) Prior Publication Data

US 2006/0004844 A1  Jan. 5, 2006

Related U.S. Application Data

(63) Continuation of application No. 10/425,189, filed on Apr. 28, 2003, now Pat. No. 7,007,033.

(51) Int. Cl.
*G06F 17/30* (2006.01)
(52) U.S. Cl. .................. 707/101; 707/104.1; 707/100; 707/3
(58) Field of Classification Search ............... 707/101, 707/102, 104.1
See application file for complete search history.

(56) References Cited

U.S. PATENT DOCUMENTS 6,347,307 B1 * 2/2002 Sandhu et al. ............ 705/36 R (Continued)

OTHER PUBLICATIONS

"Integrating with External Systems: iPlanet™ Unified Development Server", Sun Microsystems, Inc., Ver. 5.0, Aug. 2001, pp. 127-156.

(Continued)

*Primary Examiner*—Jean M. Corrielus
(74) *Attorney, Agent, or Firm*—Merchant & Gould P.C.

(57) ABSTRACT

Methods and systems are provided for managing the application of one or more XML data mappings or one or more XML schema files to a spreadsheet application workbook. One or more XML schema files for associating to the spreadsheet workbook are obtained. Each schema file is iterated to determine if one or more additional schema files are identified in each of the obtained schema files. Each obtained schema is parsed to determine data definitions, elements, attributes, structure, and simple data content required by each schema file for valid XML data. All obtained schema files are combined to create a unified schema definition. A single root element is selected to serve as a root element for the generalized instance structure. A generalized instance structure of the unified schema definition is built representing all available elements, attributes or simple data content of the unified schema definition that may be applied to the spreadsheet application workbook. A tree view of the generalized instance structure is displayed for providing a visual representation of the instance structure of the unified schema definition representing elements, attributes, structure, and simple data content of the XML defined by the unified schema definition that may be validly applied to the spreadsheet workbook according to the generalized instance structure. Writing pointers to the XML map object expresses a relationship between workbook locations and XML elements.

25 Claims, 6 Drawing Sheets

U.S. PATENT DOCUMENTS

| | | | |
|---|---|---|---|
| 6,418,446 B1 | 7/2002 | Lection et al. | 707/103 |
| 6,476,833 B1 | 11/2002 | Moshfeghi | 345/854 |
| 6,480,860 B1 | 11/2002 | Monday | 707/102 |
| 6,480,865 B1 | 11/2002 | Lee et al. | 707/523 |
| 6,487,566 B1 | 11/2002 | Sundaresan | 707/513 |
| 6,502,101 B1 * | 12/2002 | Verprauskus et al. | 707/101 |
| 6,502,112 B1 | 12/2002 | Baisley | 707/513 |
| 6,658,429 B2 * | 12/2003 | Dorsett, Jr. | 707/104.1 |
| 6,990,632 B2 * | 1/2006 | Rothchiller et al. | 715/514 |
| 7,003,722 B2 * | 2/2006 | Rothchiller et al. | 715/513 |
| 7,007,033 B1 * | 2/2006 | Rothschiller et al. | 707/101 |
| 7,017,112 B2 * | 3/2006 | Collie et al. | 715/513 |

OTHER PUBLICATIONS

Sperberg-McQueen, C.M. and Thompson, Henry, "XML Schema", W3C Architecture Domain, http://web.archive.org/web/20020802155904/http://www.w3.org/XML/Schema, 2000-2002, pp. 1-10.

Quin, Liam, "Extensible Markup Language (XML)", W3C Architecture Domain, http://web.archive.org/web/2002121962057/http://www.w3.org/XML/, 1996-2002, pp. 1-3.

Clark, James, and DeRose, Steve, "XML Path Language (XPath), Version 1.0", W3C, http://web.archive.org/web/2021010034434/http://www.w3.org/TR/xpath, 1999-2000, pp. 1-31.

"Microsoft BizTalk Server 2002—Using BizTalk Mapper", http://msdn.Microsoft.com/library/en-us/bts_2002/htm/lat_xmltools_map_intro_zkqb.asp . . . , Microsoft Corporation, 1999-2001, pp. 1-2.

"BizTalk Server 2002 Mapper User Interface", http://msdn.microsoft.com/library/en-us/bts_2002/htm/lat_xmltools_map_concept_codw . . . , Microsoft Corporation, 1999-2001, pp. 1.

"BizTalk Server 2002 Compiling Data", http://msdn.microsoft.com/library/en-us/bts_2002/htm/lat_xmltools_map_concept_drgl.a . . . , Microsoft Corporation, 1999-2001, pp. 1.

"BizTalk Server 2002 Testing Maps", http://msdn.microsoft.com/library/en-us/bts_2002/htm/lat_xmltools_map_concept_fhhy.a . . . , Microsoft Corporation, 1999-2001, pp. 1-2.

"BizTalk Server 2002 View Links and Functoids By Using Grid Preview", http://msdn.microsoft.com/library/en-us/bts_2002/htm/lat_xmltools_map_check_fuwn.as . . . , Microsoft Corporation, 1999-2001, pp. 1.

"The StarOffice™ 6.0 Suite: New Features Guide", Sun Microsystems, V. 1.1, Jul. 2002, pp. 1-31.

"New Microsoft Office Family Application Taps Power of Industry-Standard XML", http://www.microsoft.com/presspass/press/2002/oct02/10-09officefamilypr.mspx, Microsoft Corporation, Oct. 2002-Feb. 2003, pp. 1-2.

"Q&A: How 'XDocs' Alters the Paradigm for Gathering Business-Critical Information", http://www.microsoft.com/presspass/press/2002/oct02/10-09officefamily.mspx, Microsoft Corporation, Oct. 2002-Feb. 2003, pp. 1-4.

"InfoPath: Microsoft Names New Product from Office Group", http://www.microsoft.com/presspass/press/2003/feb03/02-10infopath.mspx, Microsoft Corporation, Oct. 2002-Feb. 2003, pp. 1-4.

"Microsoft Unveils Visual Studio.NET Enterprise Tools", Microsoft Corporation, http://microsoft.com/presspass/press/2001/may01/05-21vseepr.mspx, May 2001, pp. 1-4.

"Microsoft Extends XML Web Services Support in .NET Enterprise Servers Through Visual Studio .NET", http://www.microsoft.com/presspass/press/2002/feb02/02-13servervspr.mspx, Microsoft Corporation, Feb. 2002, pp. 1-3.

"How to Use XSL to Transform Excel XML Spreadsheet for Server-Side Use", http://support.microsoft.com/default.aspx?scid=kb;en-us;278976, Microsoft Corporation, Aug. 2004, pp. 1-7.

"Integrated Development Environment (IDE)", http://web.archive.org/web/20020602032242/http://altova.com/products_ide.html, Jun. 2002, pp. 1-2.

"Altova markup your mind!", http://web.archive.org/web/20021204211721/http://altova.com/products_ide.html, Dec. 2002, pp. 1-3.

"Arbortext and Accessibility", http://web.archive.org/web/20021219133536/www.arbortext.com/html/accessibility.html, Dec. 2002, pp. 1-5.

"XML Compliance, 100% Pure XML", http:web.archive.org/web/20021209185855/www.arbortext.com/html/xml_compliance, Dec. 2002, pp. 1-3.

"Schemas", http://web.archive.org/web/20021221023148/www.arbortext.com/html/schemas.html, Dec. 2002, pp. 1-3.

"Arbortext's Support for XSL-FO", http://web.archive.org/web/20021221021632/www.arbortext.com/html/xsl-fo.html. Dec. 2002, pp. 1-4.

"Corel XMetal[4], Making XML Content Creation Easy", http://web.archive.org/web/20031118215158/www.corel.com/servlet/Satellite?pagename, Nov. 2003, pp. 1-2.

"Corel XMetal 4 and Interwoven TeamXML", http://web.archive.org/web/20030807211225/www.corel.com/futuretense_cs/ccurl/corel+xml+4+and+interwoven+teamxml.pdf, Aug. 2003, pp. 1-2.

"The Corel-XyEnterprise XML Solution", http://web.archive.org/web/20030807154355/www.corel.com/futuretense_cs/ccurl/corel+and+XY+enterprise+XML+solution.pdf, Aug. 2003, pp. 1-2.

* cited by examiner

MANAGEMENT OF MARKUP LANGUAGE DATA MAPPINGS AVAILABLE TO A SPREADSHEET APPLICATION WORKBOOK

FIELD OF THE INVENTION

The present invention relates generally to management of markup language data map-available to a spreadsheet application workbook. More particularly, the present invention relates to the assembly of a plurality of Extensible Markup Language data map objects available to a given spreadsheet application workbook and to creating an overall data mapping for applying functionality made available by the overall data mapping to a spreadsheet application workbook including individual sheets, cells and ranges of cells contained therein.

BACKGROUND OF THE INVENTION

Computer software applications allow users to create a variety of documents for use in work, education and leisure. For example, a spreadsheet application allows users to store, manipulate, print and display a variety of alphanumeric data. A word processing application allows users to create letters, articles, books, memoranda, and the like. Such applications have a number of well-known strengths, including rich editing, formatting and calculation.

To keep up with demands for more advanced functionality for such computer software applications, software developers have begun to use structured data formats, including markup languages, such as Extensible Markup Language (XML), to allow users to annotate a software application document to give the document a useful structure apart from the normal functionality of the software application responsible for creating the document or apart from the visible formatting associated with the document. For example, the user may wish to create using her spreadsheet application a template document for preparation of a purchase order to be used in her company's sales department. By applying structure to the document, purchasers or other institutions or persons receiving the document data make use of the XML structure by processing the document to utilize data defined by the document structure, instead of using the structure which defines the normal functionality of the software application responsible for creating the document or apart from the visible formatting associated with the document.

Some software applications, such as word processing applications, allow users to annotate a document with XML elements so that the user may define certain data types and data definitions for data inserted into the document. A resume document, for example, may include an "experience" section in which the user will include present and past work experience. Using XML, the user may desire to markup the "experience" section of the document to define that certain allowable information in a prescribed order and in a prescribed number may be included in the experience section of the document. For example, the user may wish to markup the experience section of the document to allow four present or past experience items.

Unfortunately, prior art spreadsheet applications allow very limited use of XML data. Bulk XML data may be imported where the user points to an XML file and the spreadsheet application imports that file into the spreadsheet grid. But, the user gets no control over how the data is laid out or which data is imported because all of the data is imported. Under prior spreadsheet applications, manual coding of XML data to a spreadsheet application may be required in which a programmer writes their own custom code for handling import and/or export of XML data. This code may be in the form of an XSLT transformation file, or it may be a more traditional programming language like VBA or C++. Such custom programming is time consuming, expensive and is difficult to apply generally to spreadsheet application documents.

Prior spreadsheet applications do not establish a relationship between the XML data and the spreadsheet grid. A user defined relationship between the XML data and the grid allows the user to have a custom view of the XML data. For example, if a user only wants elements <a>, <b>, and <e> to show up in the grid, and to skip elements <c> and <d>, that preference needs to be stored somewhere. Furthermore, if the user wants element <b> to be displayed first and show up in column A, followed by elements <a> and <e> in columns B and C, that preference needs to be stored as well. If the user wants the data to begin appearing in row 6 rather than at the top of the grid sheet, that preference will need to be stored as well. Because prior spreadsheet applications allow no custom control over how the data is imported and displayed, there is nothing for the spreadsheet application to remember about the data. Accordingly, no relationship, between the spreadsheet and the XML data is established.

Accordingly, there is a need for methods and systems for mapping markup language data, such as XML data, to a spreadsheet document. There is further a need for methods and systems for managing the combination of and mapping of multiple XML schema files and XML data mappings to a spreadsheet workbook containing one or more spreadsheet worksheets.

It is with respect to these and other considerations that the present invention has been made.

SUMMARY OF THE INVENTION

Embodiments of the present invention provide methods and systems for mapping markup language structure, such as XML data, to a spreadsheet document. Methods and systems are also provided for managing the combination of multiple XML schema files and XML data mappings to a spreadsheet workbook containing one or more spreadsheet worksheets. Generally described, a spreadsheet application workbook mapping manager program enable spreadsheet application users to add and remove XML data mappings to and from a spreadsheet application workbook. Additionally, the mapping manager enables a spreadsheet application to support multiple XML schemas where each XML schema is mapped into the spreadsheet application workbook in different ways.

More particularly, methods and systems for managing the application of one or more XML data mappings or one or more XML schema files to a spreadsheet application workbook are provided. One or more XML schema files for associating to the spreadsheet workbook are obtained. If more than one schema file is obtained, the collection of schema files is assembled for associating to the spreadsheet workbook. The schema files may be obtained by selecting one or more XML schema files from a collection or directory of schema files. A user interface may be provided to enable users to select one or more schema files. The one or more schema files may also be obtained by selecting one or more XML schema files from a file directory such as the user's local computer, a network share, or URL. The one or more schema files may be obtained by opening a document into the workbook which points to one or more schema files. Once all desired or associated schema files are obtained, each schema file is iterated to determine if one or more additional schema files are identified in each of the obtained schema files. If any additional schema files are located, the additional schema files are added to the obtained schema files. Each obtained schema is parsed to determine data definitions, elements, attributes, and simple data content required by each schema file for valid XML data according to each obtained schema file. All obtained schema files are combined to create a unified schema definition in memory comprising all XML data definitions, elements, attributes and simple data content applicable to each obtained schema file.

All root elements from a target namespace of the unified schema definition defined by the schema files comprising the unified schema definition are identified. A single root element from the identified root elements is selected to serve as a root element for the unified schema definition for creation of at least one XML map from the unified schema definition. A user interface may be provided for allowing user selection of the single root element. A generalized instance structure of the unified schema definition is built representing all available elements, attributes or simple data content of the unified schema definition that may be applied to the spreadsheet application workbook. A tree view of the generalized instance structure is displayed for providing a visual representation of the instance structure of the unified schema definition, whereby the tree view contains hierarchically-structured nodes visually representing elements, attributes and simple data content of the XML defined by the unified schema definition that may be validly applied to the spreadsheet workbook according to the unified schema definition. Elements or attributes from the tree view may be applied to a target location in a given cell, cell range or worksheet of the spreadsheet application workbook. A pointer is written to the target location for pointing the target location to the selected element or attribute in the unified schema definition. A pointer is also written to the map definition, specifying both the XPath of the selected node(s) in the tree view, and the range reference(s) to which they now correspond.

These and other features and advantages that characterize the present invention will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

The following description of the embodiments of the present invention is made with reference to the above-described drawings wherein like numerals refer to like parts or components throughout the several figures. The present invention is directed to methods and systems for managing a plurality of markup language data mappings and schema files attached to, associated with, or available to a spreadsheet application workbook including individual worksheets, cells and ranges of cells contained therein.

As described in detail below, according to embodiments of the present invention, markup language structure, such as XML structure, may be mapped to a spreadsheet application workbook to provide the structure and utility of the XML to individual cells or ranges of cells in one or more sheets of the spreadsheet application workbook. According to embodiments of the present invention, XML structural components, including XML schema files and associated data type rules and definitions are collected and managed for application, as desired, to a spreadsheet application workbook. As described below with reference to FIG. 3, XML data is mapped to a spreadsheet workbook according to an XML schema attached to or associated with the workbook documents which defines a set of grammatical rules and data type rules governing the types and structure of data that may be included in the given document according to the attached or the associated XML schema.

According to embodiments of the present invention, a number of different XML schemas may be utilized to apply XML structure to different portions of a given spreadsheet workbook. For example, one XML schema file may be utilized to annotate one worksheet of a multiple sheet workbook with XML structure. A separate XML schema file may be utilized to annotate a different worksheet in the same workbook with a different set of grammatical rules and data type rules associated with XML structure applied to that worksheet. Additionally, separate instances of one XML schema file may be utilized to annotate different portions of a spreadsheet application workbook, whereby XML data is applied to one worksheet, for example according to one subset of the rules defined by that schema file, and a separate worksheet may be annotated with XML data according to a different subset of the rules governed by that same schema file.

Additionally, any given schema file may point to other schema files utilized by the first schema file to obtain additional data types and data rules according to the other schema files pointed to by the first schema file. And, a user may select a spreadsheet application workbook that has already been annotated to some extent according to a given XML schema file or according to a plurality of XML schema files.

Figure 1:
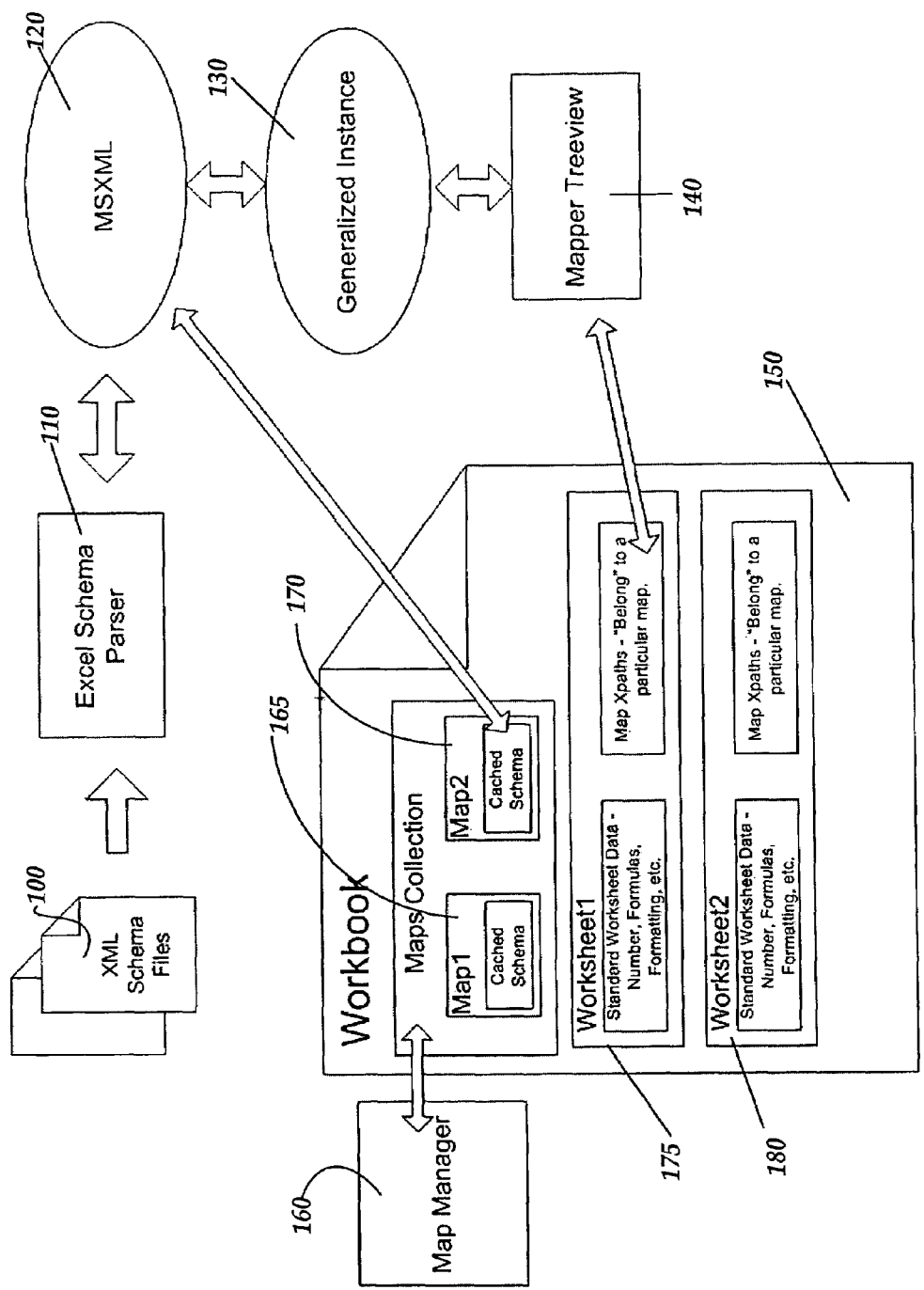
FIG. 1 is a simplified block diagram illustrating the management of a plurality of Extensible markup language (XML) data maps available to a given spreadsheet application workbook.

According to the embodiments of the present invention, the plurality of XML data maps and schema files already associated with a given spreadsheet workbook, or available to a given spreadsheet application workbook, are managed by creating an overall data map collection comprised of all available data maps and schema files for use in subsequent application to the spreadsheet application workbook. Referring now to FIG. 1, a simplified block diagram illustrating the management of a plurality of extensible markup language (XML) data maps and schema files available to a given spreadsheet application workbook is described. XML schema files 100 are identified for application to a given spreadsheet application workbook 150. As described in detail below, these identified XML schema files may be selected individually by a user via a user interface or the schema files may be selected indirectly by opening a workbook document that is already associated one or more schema files or XML data mappings. Schema files may also be provided by a schema inference engine that infers a schema from a given set of XML data not associated with a particular schema file or that is associated with a defective schema file. Any schema files selected by the user or associated with a workbook or XML data document opened by the user are parsed by a schema file parser 110 to find any additional schema files that are pointed to or associated with selected schema files.

An XML processing module 120 obtains all selected or located schema files and builds an in-memory cache of the combined collection of schema files assembled by the XML processing module 120. After the cache of the collected schema files is created, a generalized instance structure 130 of the collection of schema files is built. Prior to building the generalized instance structure, the parser module 110 determines whether the collection of XML schema files obtained by the module 120 define a complete XML data definition. That is, a determination is made as to whether required XML data type definitions and XML data grammatical rules definitions are not located and assembled with the collection of schema files. If additional schema file definitions are required, an alert may be provided to a user on or as described below.

According to an embodiment of the present invention, the generalized instance (GI) structure is created based on the one or more schemas or collection of schemas associated with the workbook as described above. Given a set of schemas that make up a plurality of XML definitions and the selection of one top-level root element, all of the possible variations in structure of actual XML data files associated with the collection of schemas (instance) is fixed, defined, and determinant. Therefore, a generalized instance of what all possible XML data instance files might look like according to the collection of schemas is defined. In effect, the GI is the "model" around which all data instances associated with any schemas making up the collection of schemas are built. All XML data files valid for unified schema definition for the collection of schemas will look somewhat like this generalized instance structure. Once a generalized instance structure 130 is constructed that defines the structure of an instance document that is structurally valid to a specific "root" element definition within the specified XML schema or XML schema associated to the selected workbook 150, a tree view representation 140 of the generalized instance structure may be provided for applying XML data represented by the generalized instance structure to the spreadsheet workbook 150 including individual cells, cell ranges, individual or multiple worksheets contained in the workbook 150.

A workbook XML maps manager module 160 includes a software application program or routine for directing the above-described management process. In accordance with embodiments of the present invention, where multiple XML data maps defined by the rules of a plurality of XML schema files are available to a given spreadsheet application workbook, management of the multiple XML data maps and XML schema files allows for the generation of an overall XML data mapping whereby XML data from any of the multiple XML data mappings and associated XML schema files may be applied to a given spreadsheet application workbook from a plurality of tree view representations of the overall data maps. According to embodiments of the present invention, each data map has its own tree view. When there are multiple maps in the workbook, multiple entries are shown in the workbook map management dialog box (FIG. 4), as well as, a dropdown control above the tree view to select which map tree view will be rendered in the tree view. Each map is rendered in the tree view one at a time, based on the map the user has selected in the dropdown.

Operating Environment

Figure 2:
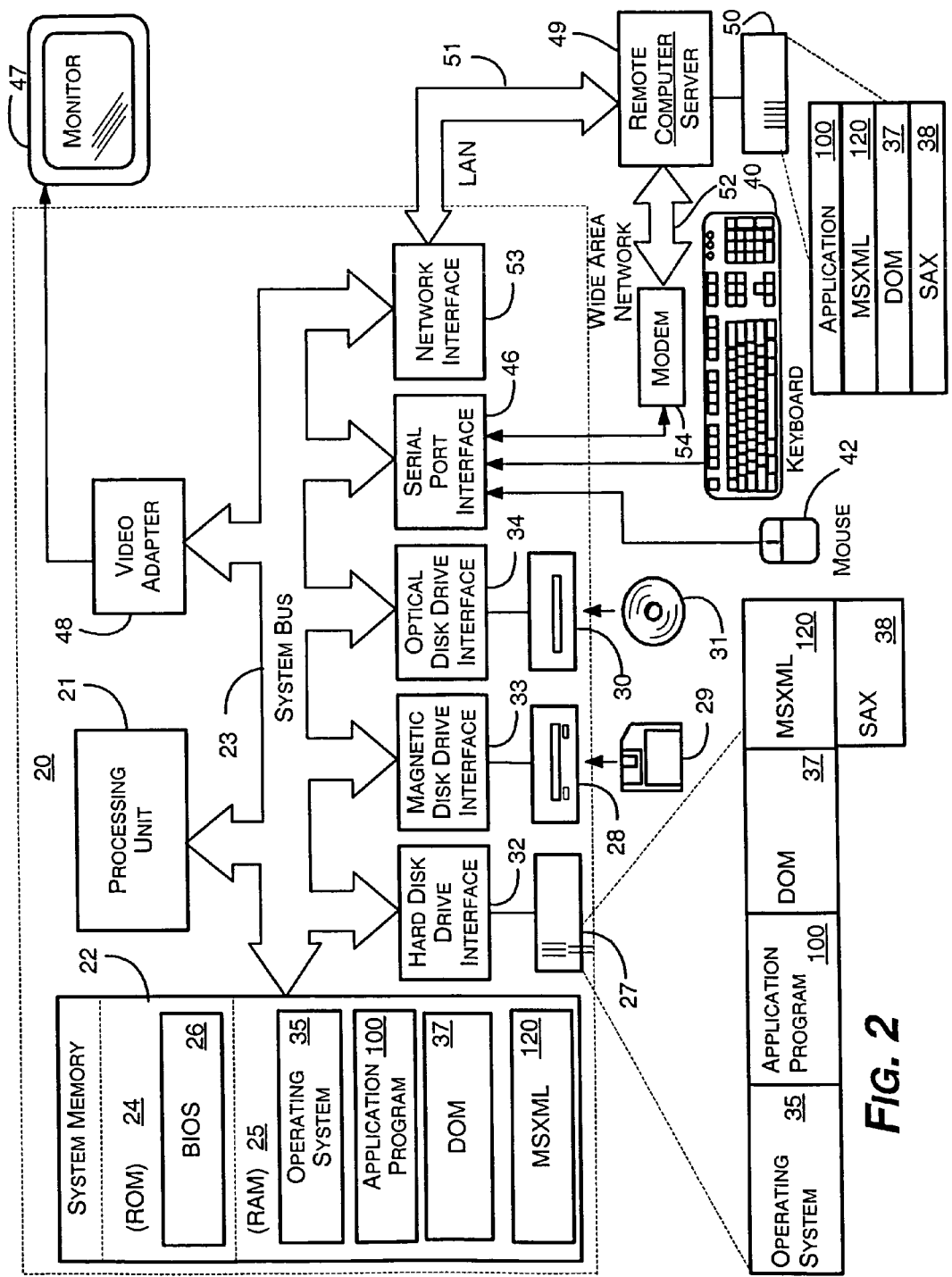
FIG. 2 is a block diagram of a computer and associated peripheral and networked devices that provide an exemplary operating environment for the present invention.

FIG. 2 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, cell phones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a conventional personal computer 20, including a processing unit 21, a system memory 22, and a system bus 23 that couples the system memory to the processing unit 21. The system memory 22 includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35 and one or more application programs 100, such as a spreadsheet application program, a word processor program, or other type of program module. Other program modules illustrated in FIG. 2 include an XML processing module 120, a document object model (DOM) parser 37, and a simple application-programming interface for XML (SAX) parser 38. According to one embodiment, the DOM 37 and the SAX 38 are components of the XML processing module 120. According to an embodiment of the invention, the XML module 120 is used by the spreadsheet application 100 for processing data formatted according to the extensible Markup Language. A suitable XML processing module is MSXML manufactured and marketed by Microsoft Corporation of Redmond, Wash.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In order to provide the document with a set of grammatical and data type rules governing the types and structure of data that may be included in a given document an XML schema is attached to or associated with the document for providing the rules governing each of the XML elements and tags with which the user may annotate the given document. For example, a "purchase order" document may have an attached or associated schema such as "purchaseorder-schema.xsd" for providing the allowable set of XML elements such as a <date> element, <price> element, <quantity> element, and so on. The schema includes the rules governing the order with which those elements may be applied to the document and specific rules associated with individual elements applied to the document. For example, a schema attached or associated with the "purchase order" document may prescribe that data associated with a given element, for example a <date> element, must include a day element, followed by a month element, followed by a year element. Additionally, the schema may require that a <date> element must immediately precede a <shipment destination> element, for example.

As is understood by those skilled in the art, developers of XML schemas determine the names of XML elements and the associated data types and data structures allowed for those elements. Then, all users of documents annotated with XML structure according to a given schema may utilize the data contained within the XML structure without regard to the overall type and structure of the document. For example, if a "purchase order" document, described above, is transmitted to a purchaser of the goods, the purchaser may develop software applications for parsing the document to locate specific types of data within the document for use by the purchaser. The purchaser may, for example only wish to print serial numbers and associated prices for certain goods. Using the schema attached to the document, the purchaser will know that the data associated with the XML elements have been prepared according to the schema governing the document. Accordingly, the purchaser may develop a software application or an Extensible Stylesheet Language Transformation (XSLT) file for locating the <price> element and for extracting the data associated therewith for insertion into the purchaser's own documents.

Following with this example, a number of different purchasers may subscribe to the same schema for dictating the rules associated with the "purchase order" document so that each purchaser may then receive the "purchase order" document from the author of the document and use the data contained in the purchase order according to the XML elements structuring the data. That is, a first purchaser may only be interested in the data contained within the <price> element, while a second purchaser may be interested in extracting only the data contained in a <shipmentterms> element. Each purchaser may extract the data it desires without regard to other aspects or elements of the document by using their own software applications or XSLT transformation files for locating the desired data according to the XML structure. This is made possible by the fact that each user of the document follows the data type and data structure rules prescribed in the schema attached to or associated with the document.

As understood by those familiar with the Extensible Markup Language, XML namespaces provide a method for qualifying elements and attribute names used in XML documents by associating those elements and attribute names with namespaces identified by uniform resources identifier (URI) references. An XML namespace is a collection of names, identified by a URI reference, which are used in XML documents as element types and attribute names. A single XML document may contain elements and attributes that are defined for and used by multiple software modules. For example, in accordance with an embodiment of the present invention, a single XML document, such as a spreadsheet document, may contain elements and attributes defined and used by different software modules. For example, a spreadsheet document may have elements and attributes defined for and used by a spreadsheet application XML processing module, or the document may contain elements and attributes defined for and used by or associated with one or more schema files associated with the document. For example, elements and attributes may be associated with the spreadsheet document to associate the document with a schema file associated with a purchase order, resume document, a legal document, and the like. Accordingly, an individual document, such as an exemplary spreadsheet document may have a namespace identifying the element types and attribute names associated with each of the different software modules that may consume or use data from the document. Standard XML data types have been defined by the World Wide Web consortium (W3C) at http://www.w3.org/2001/XMLSchema-datatypes, the disclosure of which are incorporated herein by reference.

In order to import an XML data file to a spreadsheet document and in order to export an XML data file from a spreadsheet document, the spreadsheet application "remembers" the relationships between cells and list objects fields in the spreadsheet application grid and corresponding elements or attributes of an associated XML schema file defining the structure/blueprint of XML data documents corresponding to that schema file. In order to remember the relationship between the cells and/or list objects fields and elements or attributes of the associated XML schema file, cells and/or list objects fields are mapped to associated elements or attributes in the schema file. For example, if a cell is supposed to receive data when an XML data file is imported, that cell is referred to as a "mapped" cell as opposed to an "unmapped" cell that may receive data entered by a user, but that does not receive data associated with an XML data file. In order to map a cell or list object field with an associated element or attribute of the XML schema file, markers known as XPATHs are stored in the spreadsheet document to point a given cell or list object field to a corresponding element or attribute in an associated XML data file. Use of and operation of XPATHs are defined by the World Wide Web consortium.

Accordingly, the map is a collection of XPATH markers that define a relationship between the spreadsheet application grid and a particular elements defined in an XML schema file where the XPATH is a pointer back to the XML node in a valid XML data file. For example, if cell B1 has an XPATH marker that points to the <date> element in an associated XML data file, the relationship between cell B1 and the <date> element of the associated schema file is maintained when an XML data file containing the element <date> is imported to a spreadsheet document 150 via a spreadsheet application. For example, if the imported XML data file includes a <date> element with value "2003-01-02", and the map in the spreadsheet document specifies that cell B1 of the document 150 is related to the <date> element (by an XPATH referencing the <date> element), then cell B1 will contain "2003-01-02" once the import is finished. For a further description of mapping data in a document to an associated schema file, see U.S. patent application entitled "Markup Language Visual Mapping", application Ser. No. 10/377,256, filed Feb. 28, 2003 and assigned to the same assignee as the present application, which is incorporated herein by reference as if fully set out herein.

Figure 3:
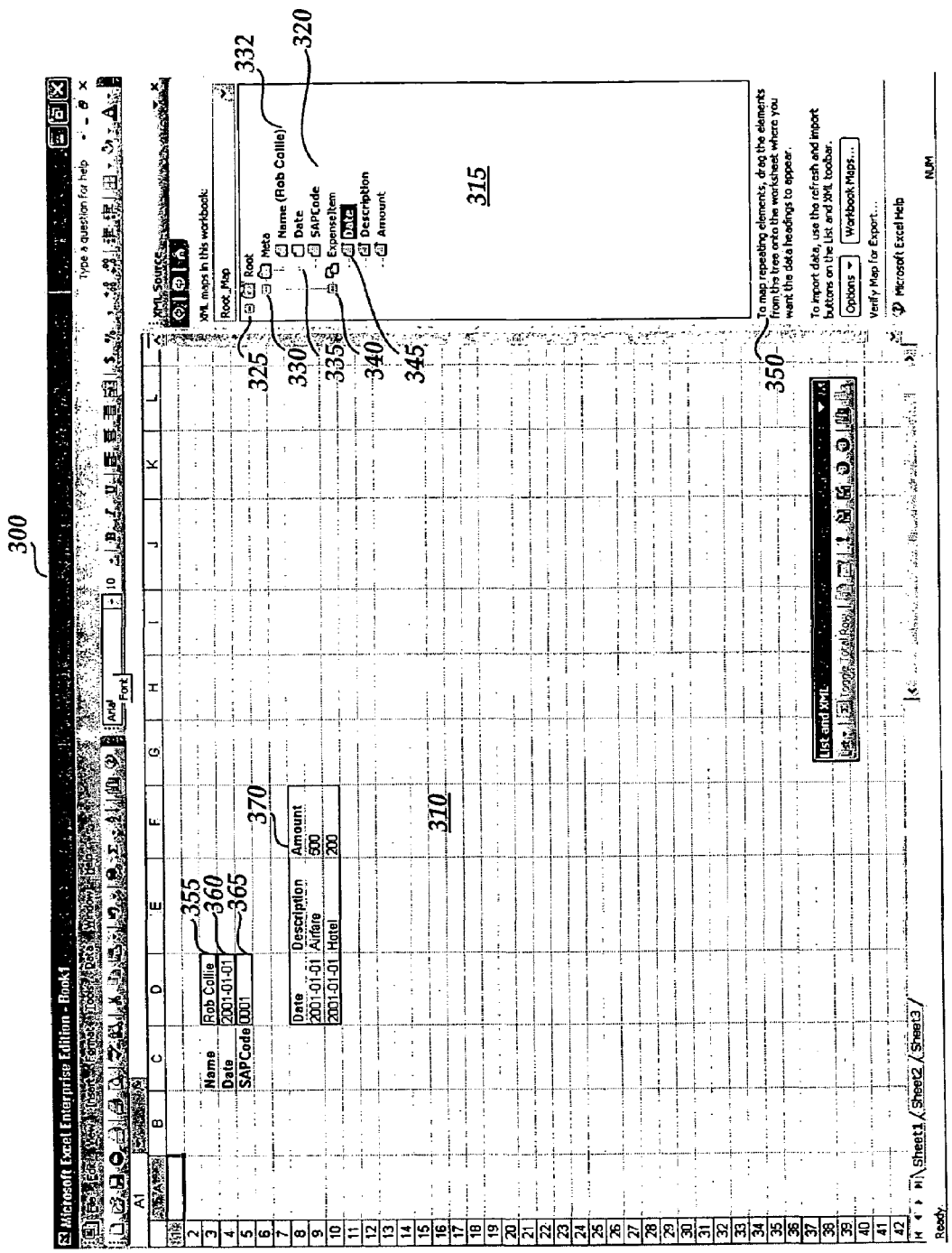
FIG. 3 illustrates a computer screen display of a typical spreadsheet application grid and associated tree view pane showing a generalized instance of an Extensible Markup Language (XML) schema file associated with the spreadsheet document opened to a spreadsheet application workspace grid.

FIG. 3 illustrates a computer screen display of a typical spreadsheet application worksheet and an associated tree view pane showing a generalized instance of an XML schema file associated with the spreadsheet document. Further, FIG. 3 illustrates a mapping of XML elements or attributes of the XML schema file to a spreadsheet application workspace grid. According to the exemplary screen display 300 illustrated in FIG. 3, a spreadsheet application grid (hereafter "grid") 310 is illustrated for entering, manipulating, and calculating data including text and numeric data. On the right hand side of the screen display 300, a tree view 320 of a generalized instance of an XML schema file is presented in a task pane 315. The tree view structure 320 includes a root element 325, and child elements 330 and 340 and a plurality of child elements 335 and 345 under the elements 330 and 340, respectively. The tree view 320, illustrated in FIG. 3, represents a generalized instance of an XML schema file attached to or associated with the spreadsheet document illustrated in the spreadsheet grid 310. Cells 355, 360, and 365 illustrate single non-repeating elements dragged to the grid 310 from the tree view structure 320. The list objects 370 illustrate repeating elements, <description>, <amount> and <date>, dragged from the tree view structure 320 to the grid 310. As illustrated in FIG. 3, data associated with those elements is also illustrated. The non-repeating element 355, 360 and 365 are shown structured in cells D3, D4, and D5 of the grid 310. Associated data is entered into each of those cells, as shown in FIG. 3. The repeating element <date> and the repeating elements <description> and <amount> are annotated at target locations D8, E8, and F8 respectively. Associated data is shown as a list under headings associated with those elements.

According to an embodiment of the present invention, dragging a given element or attribute from the tree view 320 to the grid 310 allows the user to annotate a target location in the grid 310 with markup language (for example, XML) structure associated with the dragged and dropped element or attribute. For example, referring to FIG. 3, the <date> element 335 is dragged from the tree view structure 320 to a target location Cell D4 in the grid 310. Data associated with that target location, for example "2001-01-01" illustrated in FIG. 3, is shown in the target spreadsheet Cell D4. Once the selected element or attribute is dragged from the tree view structure 320 and is dropped onto a target location in the spreadsheet grid 310, an XPATH marker is written to the target location to point the target location back to an XML node (element or attribute) that is located within a valid XML data file.

The mapping of the XML elements or attributes to target locations in the spreadsheet grid, as described above, is advantageous because it allows the spreadsheet application to interact with other applications that are not compatible with or otherwise do not speak the same language as that of the spreadsheet. If the spreadsheet application imports XML data from a financial accounting system, for example, the accounting system does not have to know the data is being consumed by a spreadsheet application on the other end so long as the spreadsheet application can understand the XML data in question (via an XML data mapping). Likewise, if the spreadsheet application exports data back to that accounting system, the accounting system does not have to know the data is coming from the spreadsheet application so long as the data conforms to an XML schema that the accounting system understands. If the consumer wishes to extract the "date" from the exported XML data file, the consuming application may make use of the XML standard technologies to readily locate data associated with the "date" for extracting the data or otherwise utilizing the data. That is, in accordance with embodiments of the present invention, the annotation of the spreadsheet grid 310 with markup language structure and association of that structure with a markup language schema file for defining data associated with the structure enables the spreadsheet application, for example, to generate an XML data document for subsequent use and consumption by other consuming applications capable of consuming and using the markup language data now associated with the spreadsheet application grid 310.

Workbook XML Maps Management

Figure 4:
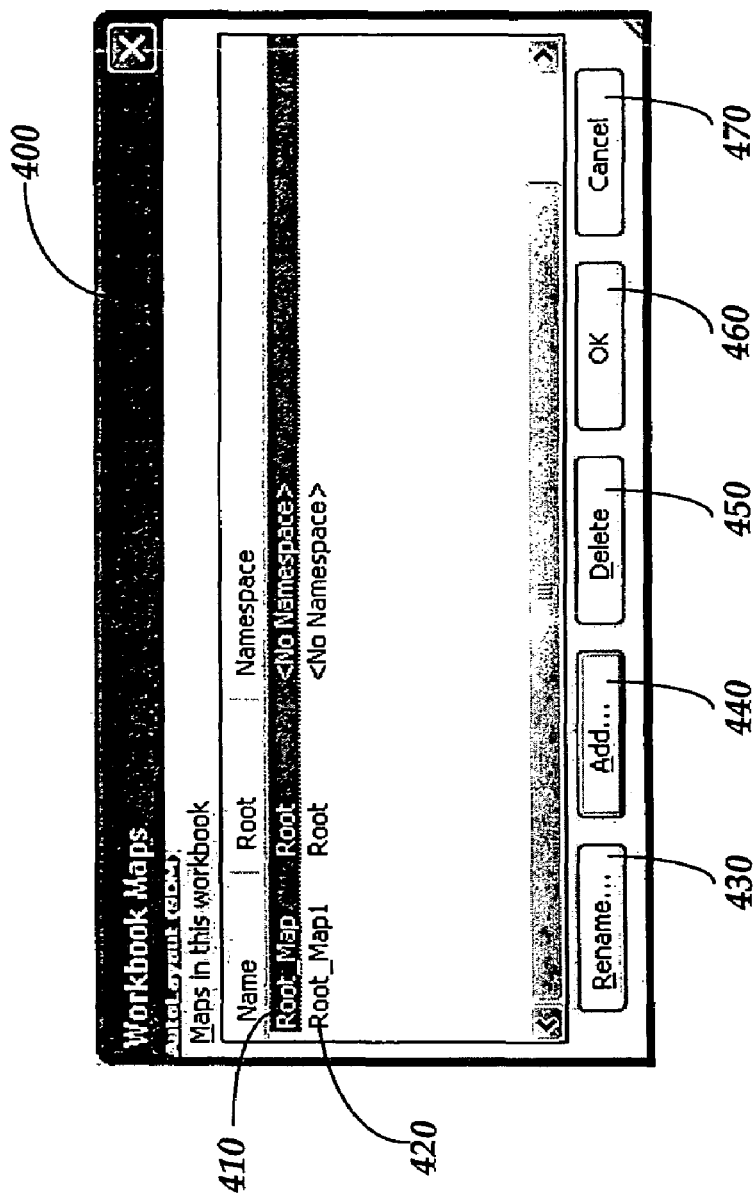
FIG. 4 is illustrates a computer screen shot of a spreadsheet application workbook mapping management dialog box.

FIG. 4 is illustrates a computer screen shot of a spreadsheet application workbook map management dialog box. As briefly described above with reference to FIG. 1, embodiments of the present invention provide for the management of multiple XML data mappings and schema files available to or associated with a given spreadsheet workbook. According to one embodiment of the invention, a user may initially open a spreadsheet document into the workbook 150 that is already associated with one more XML data mappings and schema files. In that case, the data mapping management functionality of the present invention may assemble all XML schema files related to one map definition for preparation of a generalized instance of the collection of schema files so that the user may prepare a mapping for the spreadsheet workbook. According to another embodiment of the invention, a dialog box or user interface 400, illustrated in FIG. 4, may be provided to the user to allow the user to specify known XML data maps or create a new XML map by specifying new schema files to be added to the collection of XML data maps for use by user in mapping the XML data structure to a spreadsheet workbook. Using the user interface 400, a user may select schema files from a file system directory containing schema files.

As shown in FIG. 4, a first data mapping 410 and a second data mapping 420 are provided. According to an embodiment of the present invention, the user may desire to apply the XML data associated with one or both of the available data mappings to the user's spreadsheet workbook 150. Accordingly, the user may select one of or both (but only work with one at a time) data map 410, 420 to map to the grid prepared in accordance with the present invention. For example, the first data mapping 410 may be associated with an XML schema provided by a first financial institution and the second data mapping 420 may be a data mapping associated with an XML schema provided by a second financial institution. A user may desire to annotate a first worksheet of a single workbook 150 using a data mapping associated with the first financial institution's schema, and the user may desire to apply XML data to a second worksheet within the same workbook according to the schema of the second financial institution. According to an embodiment of the present invention, the user may select the first data mappings and the data mapping management functionality of the present inventions will create a generalized instance structure 130 to allow the user to apply XML data from that XML map that makes available the XML data types and data definitions of the first of the financial institution's schemas. Next, the user may select the second XML data map to work with, via either the dropdown selection control in the task pane 315, or via the Workbook Maps dialog 400. After selecting the second XML data map, the data mapping management functionality of the present invention creates a generalized instance structure 130 to allow the user to apply XML data from that XML map that makes available the XML data types and data definitions of the second of the financial institution's schemas.

As described above with reference to FIG. 1, once one of the available data mappings are selected by the user, the XML module 120 obtains all XML schema files associated with or pointed to by the selected XML data map for the ultimate preparation of a generalized instance structure of the collection of XML schema files that will be available for mapping to the workbook 150. Similarly, if the user desires to delete a given XML data map from the collection of data map available for use by the workbook 150, the user may select a given one data mappings followed by selection the "Delete" button 450. Other functionality including "renaming" one or more data mappings is also available via the user interface 400.

Figure 5:
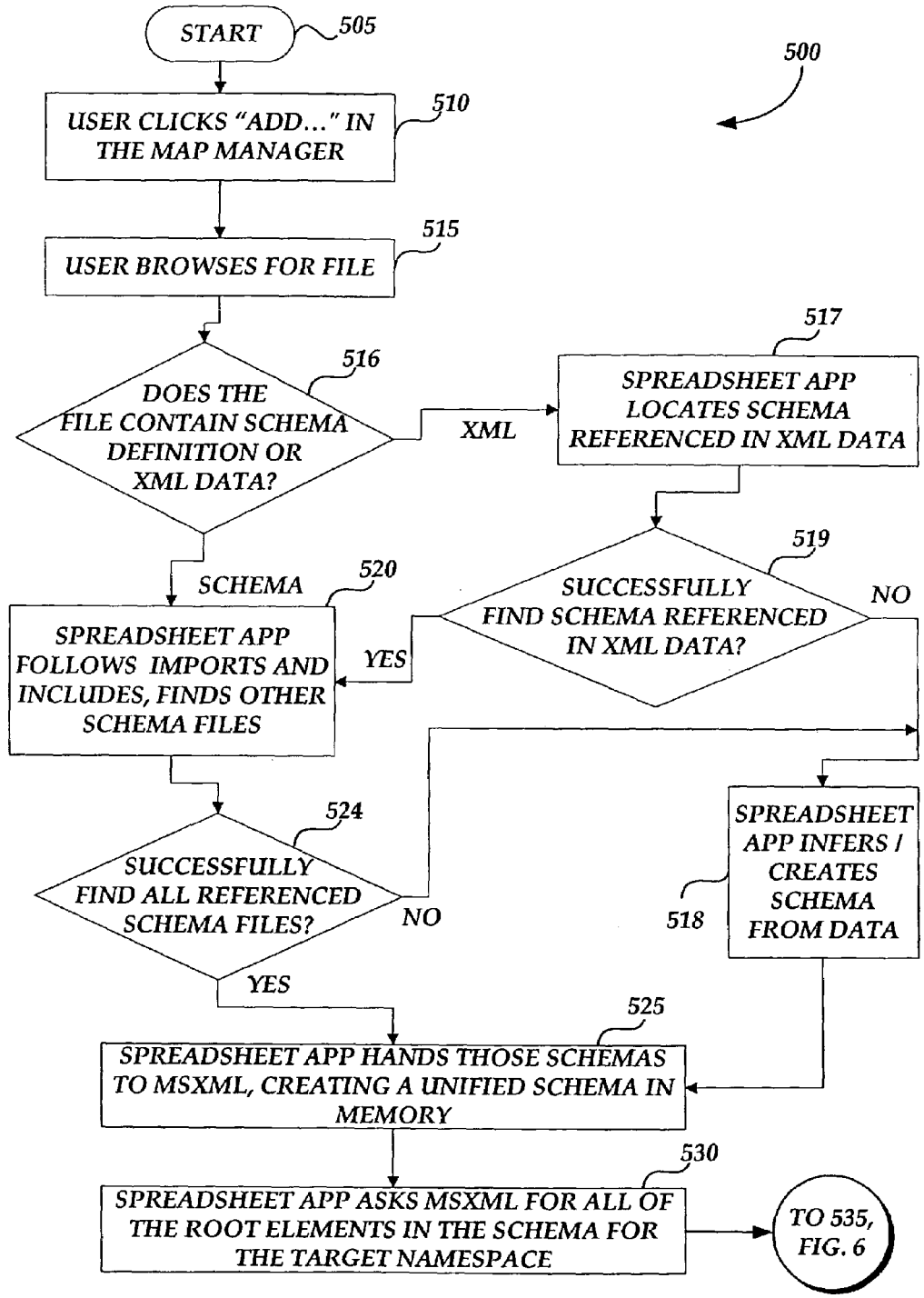
FIGS. 5 and 6 are flowcharts illustrating a method for managing a plurality of markup language data maps available to a given spreadsheet application workbook.
Figure 6:
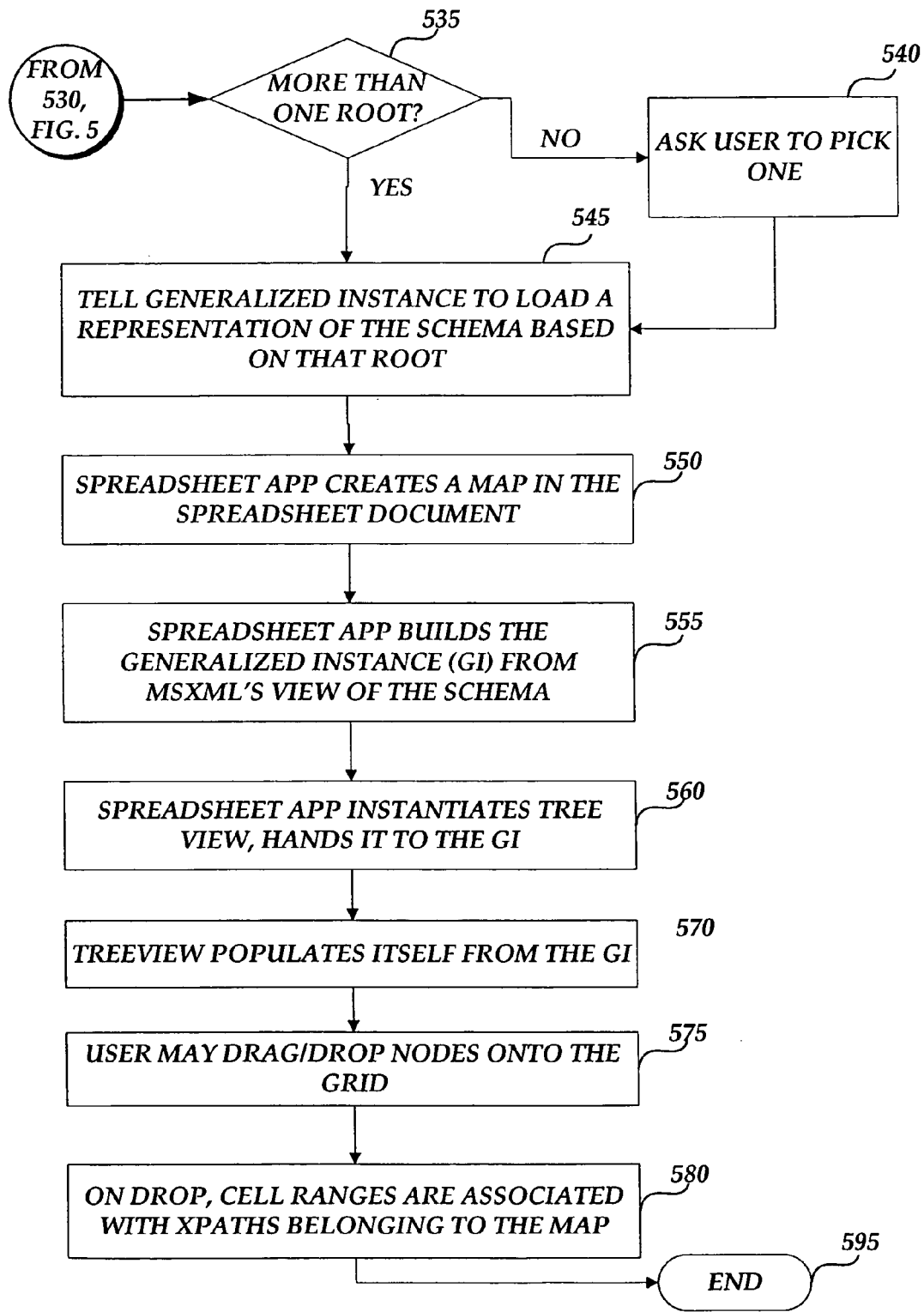

FIGS. 5 and 6 are a flowcharts illustrating a method for managing a plurality of markup language data maps available to a given spreadsheet application workbook. The method 500 begins at start step 505 and moves to step 510 where a user performs an action which causes the workbook mapping manager 160 program module to begin the process of collecting one or more XML schema files associated with a plurality of XML data mappings or XML data files for use with the user's spreadsheet application workbook. At steps 510 and 515, the user may launch the workbook maps dialog interface 400, illustrated in FIG. 4, in order to add one or more XML data mappings to the users workbook 150, as described above. Alternatively, the user may open a document into the users workbook 150 that has XML structure applied to the document and which points to one or more XML schema files associated with the XML data. As should be understood, each XML schema file selected by the user via the user interface 400 or indirectly by opening a document into the users workbook 150 may similarly point to additional XML schema files that supplement or otherwise associated with the schema of the selected schema file. At step 520, the XML processing module 120 obtains all selected or identified schema files through an iterative process. That is, the XML processing module 120 obtains the first selected schema file or the first schema file pointed by an XML data file opened by the user (step 515), and the XML processing module 120 then parses the first obtained XML file to determine at step 516 whether the XML file located by the user contains schema definitions or XML data. If it is determined that the located file contains schema definitions, then the process continues at step 520 where the XML processing module 120 parses the schema file to determine whether that schema file points to other related or associated schema files, and so on until all available schema files associated with the selected or first obtain schema files are located and obtained by the XML processing module 120.

If it is determined that the located file contains XML data, then the process continues at step 517 to determine the location of schema files referenced in the located XML data file. If the schema files referenced within the located XML data file are successfully retrieved, then the process continues at step 520 where the XML processing module 120 parses the schema file to determine whether that schema file points to other related or associated schema files, and so on, until all available schema files associated with the selected or first obtain schema files are located and obtained by the XML processing module 120. At both steps 519 and 524, if the schema files referenced within the located XML data file are not successfully retrieved, or the references do not exist, then the process may proceed to step 518 and use a schema inference module to create the required schemas, and continue at step 525, where those schemas are added to the workbook cache of schemas. For a detailed description of a method and system for inferring a schema file, see U.S. patent application entitled "Method and System for Inferring a Schema from a Hierarchical Data Structure for Use in a Spreadsheet", application Ser. No. 10/376,781, filed Feb. 28, 2003, assigned to the same assignee of the present application and which is incorporated herein by reference as if fully set out herein.

As should be understood, in some instances XML data may be applied to an XML data file opened by the user, but no associated XML schema file may be identified or pointed to by the XML data file. For example, the user may have opened an XML data file without associating or attaching a particular XML schema file. If the XML module 120 determines that additional XML schema is required to create a generalized instance structure representing all required XML schema files, the XML processing module 120 may notify the workbook mapping manager 160 and an alert may be provided to the user. For example, the user may be alerted that additional XML schema is required to complete the overall data mapping. In response, the user may cancel the current schema collection process and separately launch the user interface 400 to select an XML schema file or other data mapping required by the workbook XML maps manger 160 that references all required schema files. Alternatively, if no additional schema files are available to the user in response to the alert, an XML schema inference module may be utilized for inferring a new schema that will define the XML data structure to be applied to or associated with the workbook 150. According to one embodiment of the present invention the inference module will infer a whole new schema file as opposed to inferring only a portion of the schema file that is missing from the collection of schema files obtained by the XML processing module 120. For a detailed description of a method and system for inferring a schema file, see U.S. patent application entitled "Method and System for Inferring a Schema from a Hierarchical Data Structure for Use in a Spreadsheet", application Ser. No. 10/376,781, filed Feb. 28, 2003, assigned to the same assignee of the present application and which is incorporated herein by reference as if fully set out herein.

At step 525, the workbook mapping manager 160 creates a unified schema cache of the obtained (collected) schema files and passes the file processing to the XML module 120 in preparation for the creation of a generalized instance structure representative of all obtained schema files. At step 530, the map manager 160 queries the XML processing module 120 for all root elements of the unified schema definition comprised of the collection of schema files obtained by the workbook XML maps manager 160. As understood by those skilled in the art, a given XML data must have a single root element from which all other elements in the file descend. According to embodiments of the present invention, as part of the process of creating a unified schema definition structure from the collection of available schema files, a single root element must be selected. At step 535, if more than one root element is identified by the XML processing module 120 to the map manager 160, the method proceeds to step 540, and the user may be presented with a user interface to allow the user to select from one of multiple potential root elements. As should be understood by those skilled in the art, for each of the plurality of schema files collected in accordance with the present invention, a top-level root element may have been defined such that selection of one of the top-level root elements is required for creation of a unified schema definition from the collection of schema files. On the other, if the user originally started this process by selecting an XML data file document where a single root element is known, no selection from multiple potential root elements is required. If no more than one root element is identified, or after the user has selected a root element, the method proceeds to step 545.

At step 545, the generalized instance module 130 builds a generalized instance structure of the unified schema definition comprised of the collection of schema files obtained above. At step 550, the workbook XML maps manager 160, creates a map object of XML data from the collection of XML schema files to the workbook 150 where various elements and/or attributes of one or more schema files comprising the collection of schema files may be applied to cells, ranges of cells, or worksheets within the workbook 150. The mapping of data applied to the workbook 150 is in accordance with the description of FIG. 3 above. At step 555, the spreadsheet application via the workbook mapping manager 160 obtains the generalized instance structure representation from generalized instance module 130 created at step 545, and the spreadsheet application builds a generalized instance structure with which to instantiate a tree view 320 to allow the user to map elements from the tree view to the workbook 150.

At step 560, the spreadsheet application instantiates the tree view 320, and at step 570, the tree view 320 is populated into the tree view pane 315 for presentation to the user. As should be understood, the tree view 320 populated into the pane 315 at step 570 is a tree view structure representative of the generalized instance structure comprised of all of the schema files collected by the XML module 120 at steps 517-524. After the tree view has been populated, as described, at step 575, the user may now drag and drop elements and attributes from the tree view 320 onto the worksheet grid of the workbook 150, as described above with reference to FIG. 3. At step 580, XPATHS pointing dropped elements or attributes back to associated elements and/or attributes of the unified schema definition are written to the resulting overall XML data map. The method ends at step 595.

As described herein, embodiments of the present invention relate to methods and systems for managing multiple XML data maps and schema files available to a spreadsheet application workbook. According to embodiments of the present invention, user input may be obtained for determining whether one or more of the multiple mappings available to the user's spreadsheet workbook are desired by the user. If so, a generalized instance structure is created from a collection of schema files selected by or identified by documents or schemas selected by the user, and an overall XML data map for applying XML data from the unified schema set may be generated. A tree view structure representing all elements and/or attributes from the unified schema definition may be presented to the user to allow the user to apply any or all of those elements or attributes to the user's spreadsheet workbook. It will apparent to those skilled in the art that various modifications or variations may be made in the present invention without departing from the scope or spirit of the invention. Other embodiments of the invention will be apparent to those skilled in the art from consideration of this specification and practice of the invention disclosed herein.

We claim:

1. A computer implemented method of managing an application of structured data and data mappings to a spreadsheet application, comprising:
    obtaining the structured data, wherein the structured data comprises one or more data definitions associated with the spreadsheet application;
    parsing the structured data to determine the one or more data definitions and structure required for valid data of the spreadsheet application;
    combining the structured data received from multiple sources to create a unified schema definition comprising data definitions and structure applicable to the structure data;
    selecting a root element from the unified schema definition for constructing a generalized instance;
    creating a map object to maintain all information about the data mappings, wherein the information about the data mappings comprises schema definitions used, name of the map, and relationship of fields to spreadsheet application cell ranges;
    building a generalized instance structure from the unified schema definition, wherein the generalized instance structure presents available fields and data content of the unified schema definition; and displaying a view of the generalized instance structure for providing a visual representation of a valid data file wherein the view contains fields for visually representing the fields and data content of the unified schema definition.

2. The method of claim 1, wherein obtaining the structured data includes selecting the structured data from a source of schema files.

3. The method of claim 2, further comprising providing a user interface for allowing selection of the structured data from the source of schema files.

4. The method of claim 1, further comprising:
iterating through the structured data to determine if additional structured data is identified; and
if additional structured data is identified, adding the additional structured data to the obtained structured data.

5. The method of claim 2, wherein obtaining the structured data includes opening a spreadsheet or data document in the spreadsheet application, wherein the spreadsheet or the data document points to the structured data.

6. The method of claim 1, further comprising combining the obtained structured data and adding the combined structured data to a schema object model.

7. The method of claim 1, prior to selecting a root element to serve as a root element for the generalized instance structure, further comprising:
identifying all root elements defined by the unified schema definition for a target namespace for each root element; and
selecting a single root element from the identified root elements to serve as a root element for the generalized instance structure, wherein the single root element is utilized for the creation of at least one data mapping from the unified schema definition.

8. The method of claim 7, further comprising providing a user interface for allowing user selection of the singe root element.

9. The method of claim 1, further comprising:
applying a field from the tree view to a target location in the spreadsheet application workbook; and
writing a pointer to the target location for pointing the target location to the selected field of the valid data file.

10. The method of claim 1, whereby displaying the tree view of the generalized instance structure includes writing a pointer to each field in the generalized instance structure for pointing a given field in a valid data instance to a target location in the spreadsheet application where the given field is applied.

11. The method of claim 10, further comprising building a collection of pointers associated with the given fields applied to the spreadsheet application.

12. The method of claim 11, whereby building a collection of pointers associated with the given fields applied to the spreadsheet application includes creating a map object expressing the relationships between the spreadsheet application and fields expressed in the generalized instance structure for pointing cell ranges of the spreadsheet application to markup language fields which have been applied to corresponding fields in the unified schema definition.

13. The method of claim 10, wherein writing a pointer to each field in the generalized instance structure includes writing an XPATH to associate each field in the generalized instance structure with the target locations in the spreadsheet application.

14. A computer implemented method of managing an application of structured data and data mappings to a spreadsheet application, comprising:
obtaining the structured data, wherein the structured data comprises one or more data definitions associated with the spreadsheet application;
parsing the structured data to determine the one or more data definitions and structure required for valid data of the spreadsheet application;
combining the structured data received from multiple sources to create a unified schema definition comprising data definitions and structure applicable to the structure data;
selecting a root element from the unified schema definition for constructing a generalized instance;
creating a map object to maintain all information about the data mappings, wherein the information about the data mappings comprises schema definitions used, name of the map, and relationship of fields to spreadsheet application cell ranges;
building a generalized instance structure from the unified schema definition, wherein the generalized instance structure presents available fields and data content of the unified schema definition; and
displaying a view of the generalized instance structure for providing a visual representation of a valid data file wherein the view contains fields for visually representing the fields and data content of the unified schema definition;
applying a field selected from the view to a target location in the spreadsheet application;
writing an XPATH pointer to the target location for pointing the target location to the selected field element or attribute of the valid data file;
creating a mapping between the spreadsheet application and the generalized instance structure including building a collection of XPATH pointers associated with the fields that are applied to the spreadsheet application for pointing cells which are mapped to a field applied to the spreadsheet application, to corresponding fields in the generalized instance structure;
providing a visual indication in the tree of fields that have been applied to the spreadsheet application; and
providing a visual indication in the target location that the selected field has been applied to the target location.

15. The method of claim 14, wherein obtaining the structured data includes selecting the structured data from a source of schema files.

16. The method of claim 15, further comprising providing a user interface for allowing selection of the structured data from the source of schema files.

17. The method of claim 14, further comprising:
iterating through the structured data to determine if additional structured data is identified; and
if additional structured data is identified, adding the additional structured data to the obtained structured data.

18. The method of claim 14, wherein obtaining the structured data includes opening a spreadsheet or data document in the spreadsheet application, wherein the spreadsheet or the data document points to the structured data.

19. The method of claim 14, wherein obtaining the structured data, further includes selecting a data mapping already associated with the spreadsheet application, wherein the data mapping points to one or more schema files.

20. The method of claim 14, further comprising combining the obtained structured data and adding the combined structured data to a schema object model.

21. The method of claim 14, prior to selecting a root element to serve as a root element for the unified schema definition, further comprising:
identifying all root elements defined by the unified schema definition for a target namespace for each root element; and
selecting a single root element from the identified root elements to serve as a root element for the generalized instance structure, wherein the single root element is utilized for the creation of at least one data mapping from the unified schema definition.

22. The method of claim 21, further comprising providing a user interface for allowing user selection of the singe root element.

23. A computer readable medium containing having computer readable code embodied therein for managing an application of structured data comprising:
obtaining the structured data, wherein the structured data comprises one or more data definitions associated with the spreadsheet application;
parsing the structured data to determine the one or more data definitions and structure required for valid data of the spreadsheet application;
combining the structured data received from multiple sources to create a unified schema definition comprising data definitions and structure applicable to the structure data;
selecting a root element from the unified schema definition for constructing a generalized instance;
creating a map object to maintain all information about the data mappings, wherein the information about the data mappings comprises schema definitions used, name of the map, and relationship of fields to spreadsheet application cell ranges;
building a generalized instance structure from the unified schema definition, wherein the generalized instance structure presents available fields and data content of the unified schema definition; and
displaying a view of the generalized instance structure for providing a visual representation of a valid data file wherein the view contains fields for visually representing the fields and data content of the unified schema definition.

24. The computer readable medium of claim 23, containing instructions which when executed by a computer further perform creating a mapping between the spreadsheet application and the generalized instance structure including building a collection of pointers associated with the fields that are applied to the spreadsheet application for pointing spreadsheet application cell ranges in the spreadsheet application to corresponding fields in the generalized instance structure.

25. The computer readable medium of claim 24, containing instructions which when executed by a computer further perform the steps of providing a visual indication in the view of fields that have been applied to the spreadsheet application and providing a visual indication in a target location that a selected field has been applied to the target location.

* * * * *